3,079,365
ELASTOMERIC BLENDS OF CHLOROPRENE POLYMERS AND POLYMERS OF 2,3-DICHLORO-1,3-BUTADIENE

Donald E. Andersen, Louisville, Ky., and Kurt L. Seligman, Brandywine Hundred, Del., assignors to E. I. du Pont de Nemours and Company, Wilmington, Del., a corporation of Delaware
No Drawing. Filed Mar. 7, 1961, Ser. No. 93,862
3 Claims. (Cl. 260—45.5)

This invention relates to novel elastomers and more particularly to blends of chloroprene polymers with polymers of 2,3-dichloro-1,3-butadiene, which blends have improved processing properties and yield vulcanizates having excellent tensile properties.

For certain applications, particularly in cases where a chloroprene polymer is to be extruded through dies to form articles of complicated cross-section or thin-walled articles, the polymer must not only be sufficiently plastic to extrude readily through the die, but the extruded article must be able to retain its shape, size and smoothness before and during vulcanization. Particularly for use in wire and cable coverings, it is important not only that the chloroprene polymer composition possess good extrusion characteristics, but that the resulting vulcanizates possess excellent tensile strength.

In general, it is difficult to modify the extrusion characteristics of a chloroprene polymer without adversely affecting the tensile strength.

It is an object of the present invention to provide a novel elastomeric composition. A further object is to provide an elastomeric composition having outstanding extrusion characteristics combined with good tensile strength of the final vulcanizates. A still further object is to provide an elastomeric composition comprising a blend of a benzene-soluble solid polymer of chloroprene with a xylene-soluble solid polymer of 2,3-dichloro-1,3-butadiene. Another object is to provide a process for preparing such elastomeric compositions. Other objects will appear hereinafter.

These and other objects of this invention are accomplished by providing an elastomeric composition comprising an intimate blend of (a) from about 50 to 75 percent by weight of a benzene-soluble solid polymer selected from the group consisting of a homopolymer of chloroprene and a copolymer prepared by polymerizing a mixture of monomers consisting of chloroprene and up to about 20 percent by weight of 2,3-dichloro-1,3-butadiene and (b) from about 50 to 25 percent by weight of a xylene-soluble solid polymer selected from the group consisting of a homopolymer of 2,3-dichloro-1,3-butadiene and a copolymer prepared by polymerizing a mixture of monomers consisting of 2,3-dichloro-1,3-butadiene and up to about 15 percent by weight of chloroprene; with the proviso that when the percentage of component (a) in the blend is less than 55 percent, component (b) must be a copolymer prepared by polymerizing a mixture of monomers consisting of 2,3-dichloro-1,3-butadiene and from about 7 to 15 percent by weight of chloroprene. If desired, a third component, namely a benzene-soluble fluid chloroprene polymer, may be used in preparing the novel blends of the present invention. This third component may be present in an amount up to about 15 percent by weight based on the total weight of components (a) and (b) in the blend. For purposes of the present invention, the elastomeric compositions should have a tensile strength of at least about 1900 p.s.i. and should exhibit a die swell of not more than about 1.95.

The benzene-soluble solid chloroprene polymers which are used as component (a) in the blends of the present invention and their preparation are described in numerous references. See, for example, the following U.S. patents: 1,950,436; 2,227,517; 2,321,693; 2,371,719; 2,463,225; 2,481,044; 2,494,087; 2,567,117; 2,576,009; 2,831,842; and 2,914,497. Unreacted monomer may be removed as described in U.S. 2,467,769. The term "chloroprene" as used throughout the present specification and claims defines the compound 2-chloro-1,3-butadiene. A 2 to 3-gram sample of these polymers will dissolve in about 250 ml. of benzene at room temperature within about 5 to 10 hours with mild agitation. When stating that these polymers of component (a) are "solid" it is meant that they have a Mooney viscosity of at least 25 as determined by ASTM Method D-1646-59T.

The polymers of component (a) are preferably prepared by partial polymerization of the monomer composition in aqueous emulsion in the presence of an aliphatic mercaptan having 8 to 18 carbon atoms, such as octyl mercaptan or dodecyl mercaptan.

The xylene-soluble solid polymers of component (b) may be prepared by polymerizing the monomers to be used as described in any of the patents cited above for the preparation of polymers of component (a). They are preferably prepared by the partial polymerization of the monomer composition in the presence of an aliphatic mercaptan having 8 to 18 carbon atoms, such as octyl mercaptan or dodecyl mercaptan. A 2 to 3-gram sample of component (b) polymer will dissolve in boiling xylene within a period of about 10 to 15 hours. In general, these xylene-soluble polymers are hard brittle solids.

The proportion of components (a) and (b) and the proportion of monomers used in the preparation of component (b) are critical in the preparation of an elastomeric composition combining good extrudability with high tensile strength. If the content of component (a) in the blend is greater than about 75 percent by weight, the outstanding extrusion properties are lost. The die swell increases, and the smoothness and die definition become unsatisfactory. On the other hand, if less than about 50 percent, by weight, of component (a) is present in the mixture, the tensile strength of the cured polymer blend becomes undesirably low.

If more than about 15 percent by weight of chloroprene is present in the monomer mixture used in the preparation of component (b), the desirable extrusion properties of the blend are lost. On the other hand, the lower limit of chloroprene permissible in the monomer composition used in preparing component (b) is dependent on the proportion of component (a) present in the blend. If 50 to 55 weight percent of component (a) is present in the blend, the polymer of component (b) must have been prepared from a monomer mixture containing at least 7 weight percent of chloroprene. Otherwise, the tensile strength of the vulcanizates prepared from the blend become undesirably low. In other ranges of components (a) and (b), component (b) may be the homopolymer of 2,3-dichloro-1,3-butadiene. The preferred proportions of components (a) and (b) range from 65 to 70 weight percent of component (a) and 35 to 30 weight percent of component (b). It is preferred to prepare component (b) using a monomer mixture consisting of about 3 to 7 weight percent of chloroprene and 97 to 93 weight percent of 2,3-dichloro-1,3-butadiene. Essentially the same results are obtained when component (a) is either chloroprene or a copolymer prepared by polymerizing a mixture of chloroprene and up to about 20 percent by weight of 2,3-dichloro-1,3-butadiene.

Optionally a third component, in amount up to about 15 percent, based on total weight of components (a) and (b), may be used in preparing the blends of this invention. This third component is a benzene-soluble fluid chloroprene polymer which may be prepared in a manner similar to that used in the preparation of component (a) except that the polymerization is carried out in the presence of a larger amount of a modifying agent, preferably an aliphatic mercaptan. The polymerization may be stopped before polymerization is complete or allowed to go to 100 percent monomer conversion. By fluid chloroprene polymer is meant a chloroprene polymer having an intrinsic viscosity in benzene at 30° C. not greater than about 0.12. The presence of this third component improves the smoothness of the extrudate prepared from the elastomer composition of this invention. More than about 15 percent of this component causes an undesirable loss of tensile strength of the final vulcanizate.

The blending of the components of the elastomeric composition of this invention is conveniently carried out by mixing the latices and then isolating the blend by conventional methods such as by coagulation by freezing (as described in U.S. Patent 2,187,146) or by drum drying (as described in U.S. Patent 2,914,497). It is also possible first to isolate the individual components by conventional methods and then to mix the isolated polymers by mechanical means, such as by milling or by working in an internal mixer such as a Banbury or Werner-Pfleiderer mill.

The compounding of the elastomers of this invention is like that of the conventional chloroprene polymers, as described in "The Neoprenes," published in 1953 by E. I. du Pont de Nemours and Co. In the examples a fairly high loading of clay is used as is customary in making tubing and other extruded articles, but the elastomers may also be used to advantage in gum stocks and stocks reinforced with carbon black. Waxes, oils, and other softeners and lubricants should in general be used but large amounts are not necessary. When the optional fluid chloroprene polymer in the blend is present, reduced amounts of these oils and softeners are used. The use of oils and softeners in the blend improves the smoothness of the extrudates and lowers the bulk viscosity of the blend, but has a tendency to lower the tensile properties of the vulcanizates.

The elastomer compositions of this invention display exceptionally good extrudability and give vulcanizates having excellent tensile strength. This makes them highly useful for applications such as wire and cable coverings, and in friction and calender stocks. They may be processed in any form of rubber-working equipment, such as internal mixers, compounding mills, calenders, extruders and the like, and may be used in fabricating tires and mechanical goods of all kinds, coated fabrics, tubing, coated wire, and extruded gaskets. The elastomers are particularly valuable where it is important to have a smooth surface and minimum shrinkage.

The following examples will better illustrate the nature of the present invention; however, the invention is not intended to be limited to these examples. Parts are by weight unless otherwise indicated.

EXAMPLES

A. *Preparation of Polymer*

An aqueous emulsion is made of the monomer or mixture of monomers containing modifying agent, emulsifying agent, and other materials, as specified. Polymerization is carried out by the addition of a catalyst solution as needed to maintain the desired rate of polymerization. When the desired degree of polymerization is reached, further polymerization is arrested by adding an emulsion containing "shortstopping agents." Excess monomer is removed in a turbannular stripper under vacuum at 150 mm. Hg at 60° C. The following paragraphs give the recipes and conditions used for each polymer of the examples.

Polymer A-1 (benzene-soluble solid polymer):

| | Parts by weight |
|---|---|
| Chloroprene | 100 |
| Disproportionated rosin | 3 |
| Dodecyl mercaptan | 0.25 |
| Water | 88.5 |
| Ammonia | 1.3 |
| Potassium hydroxide | 0.1 |
| Catalyst | as needed |
| Shortstop emulsion— | |
| Toluene | 0.71 |
| Phenothiazine | 0.011 |
| Mixed phosphites (mixture of 2-ethylhexyl octylphenyl phosphites) | 0.011 |
| Tert-butyl-m-cresol | 0.011 |
| Sodium lauryl sulfate | 0.13 |
| Water | 0.183 |

*Catalyst*—Water solution containing 2.0% hydrogen peroxide and 0.10% sodium 2-anthraquinonesulfonate.

| | |
|---|---|
| Temperature of polymerization, ° C | 40 |
| Percent monomer conversion | 70 |
| ML 1+2.5 at 100° C | 45 to 54 |

Polymer A-2 (xylene-soluble) (hard brittle solid):

| | Parts by weight |
|---|---|
| 2,3-dichloro-1,3-butadiene (or mixture with chloroprene as indicated in following examples) | 100 |
| Water | 115 |
| Potassium hydroxide | 0.035 |
| Potassium sulfite | 0.05 |
| Ammonium hydroxide (29 percent) | 4.7 |
| Disproportionated rosin | 3 |
| Dodecyl mercaptan | 0.49 |
| Catalyst | as needed |
| Shortstop emulsion | 1.4 |
| Catalyst— | |
| Water | 280 |
| Ammonium persulfate | 0.42 |
| Sodium 2-anthraquinone sulfonate | 0.042 |
| Shortstop emulsion— | |
| Toluene | 295 |
| Tert-butyl-m-cresol | 5 |
| Tricresyl phosphite | 5 |
| Phenothiazine | 5 |
| Water | 174 |
| Potassium hydroxide | 1 |
| Condensation product of 20 moles of ethylene oxide with one mole of technical oleyl alcohol | 15 |

| | |
|---|---|
| Temperature of polymerization, ° C | 40 |
| Percent of monomer conversion | 65 |

Polymer A-3 (fluid polymer benzene-soluble) (inherent viscosity, 0.12):

| | Parts by weight |
|---|---|
| Chloroprene | 100 |
| Disproportionated rosin | 3 |
| Dodecyl mercaptan | 5 |
| Water | 115 |
| Potassium hydroxide | 0.035 |
| Potassium sulfite | 0.05 |
| Ammonium hydroxide (29 percent) | 4.7 |
| Catalyst | as needed |
| Shortstop emulsion | 1.98 |

Catalyst—Same as for polymer A-2.
Shortstop emulsion—Same as for polymer A-2.

| | |
|---|---|
| Polymerization temperature, ° C | 40 |
| Percent monomer conversion | 70 |

Polymer A-4 (benzene-soluble) (solid polymer):

| | Parts by weight |
|---|---|
| Chloroprene | 85 |
| 2,3-dichloro-1,3-butadiene | 15 |
| Disproportionated rosin | 3 |
| Dodecyl mercaptan | 0.23 |
| Water | 120 |
| Potassium hydroxide | 0.035 |
| Potassium sulfite | 0.05 |
| Ammonium hydroxide (29 percent) | 4.7 |
| Catalyst | [1] 5.6 |
| | [2] 4.6 |
| Shortstop emulsion | 1.4 |
| Catalyst system— | |
| A two-part system (Component (1)): | |
| Water | 495 |
| Ammonium hydroxide (29 percent) | 7.7 |
| Component (2): | |
| Water | 338 |
| p-Menthane hydroperoxide | 1.7 |
| Condensation product of oleyl alcohol with 20 moles of ethylene oxide | 3.4 |
| Shortstop emulsion— | |
| Toluene | 0.90 |
| Phenothiazine | 0.014 |
| tert-butylcatechol | 0.014 |
| Water | 0.42 |
| Formaldehyde - naphthalene - sulfonic acid condensate, sodium salt | 0.014 |
| Sodium lauryl sulfate | 0.04 |

| | |
|---|---|
| Polymerization temperature, ° C | 10 |
| Percent monomer conversion | 62 |
| ML 1+4 0 at 100° C | 64 |

[1] Of component (1).
[2] Of component (2).

B. Blending and Isolating the Polymers

The latices from the above recipes are blended in the desired proportions by vigorously shaking the mixed latices. The polymer composition is isolated by feeding the latex continuously to the nip between the rolls of a 7.5-inch chromium-plated double drum dryer heated by steam at 20-55 p.s.i.g. and operating at 2-25 r.p.m.

C. Evaluation of Polymers

The isolated polymer composition is compounded using the recipes shown in the examples. The resulting stock is extruded through a 2-inch Royle extruder using a Garvey die. The compounded stock is warmed on a mill and fed to the extruder in strips. The temperature conditions of the extruder are as follows:

```
                                                 ° C.
Zone 1 _____    88
Zone 2 _____    82
Zone 3 _____    71
Die _____    93
Worm _____ 21-27
```

The speed of the worm is 35 r.p.m. The extrudate is taken from the extruder in two lengths. The length and weight of the extrudate are determined, and the weight in grams per inch of the extrudate (die swell) is calculated. (The lower the number for the die swell, the better are the working properties of the polymer.) The extrudates are examined visually for smoothness and die definition ("feather edge").

The stocks are cured in a mold in a press at 153° C. for 40 minutes (unless otherwise stated) and the stress-strain properties are measured at 25° C. by ASTM Method D412-51T.

EXAMPLE 1

A polymer is prepared as described under polymer A-2 above using 7 parts of chloroprene and 93 parts of 2,3-dichloro-1,3-butadiene as the monomer composition.

A blend containing 30 parts of this polymer and 70 parts of polymer A-1 is prepared as described in paragraph B above.

The isolated polymer blend is compounded using the following recipe:

```
                                        Parts by weight
Polymer blend _____ 100
N-phenyl-1-naphthylamine _____   1
Magnesium oxide _____   4
Petroleum wax _____   3
Clay _____  90
Zinc oxide _____   5
Light process oil _____  21
2-mercapto-2-imidazoline _____ 0.75
```

The compounded stock is evaluated as described in paragraph C above. The cures are made by heating for 25 minutes at 153° C. For comparison, polymer A-1 containing no other polymer but only 12 parts by weight of light process oil is evaluated. Table I shows the data.

TABLE I

|  | Polymer blend | Polymer A-1 (control) |
|---|---|---|
| Extrusion data: |  |  |
| Die swell | 1.83 | 2.09 |
| Smoothness | Good | Fair |
| Feather edge | Excellent | Fair |
| Stress-strain data: |  |  |
| Modulus at 300% elongation, p.s.i. | 1,000 | 775 |
| Tensile strength at the break, p.s.i. | 2,375 | 2,500 |
| Elongation at the break, percent | 700 | 760 |

From this data it can be seen that the polymer blend has improved extrusion characteristics over the control polymer and shows essentially equivalent stress-strain properties even when the control contains a higher concentration of oil diluent.

EXAMPLE 2

A polymer is prepared as described under polymer A-2 above using 4 parts of chloroprene and 96 parts of 2,3-dichloro-1,3-butadiene as the monomer composition. Blends are prepared and isolated as described in paragraph B above, containing varying proportions of polymer A-1, polymer A-2, and polymer A-3 as shown in Table II. The isolated polymers are compounded using the following recipe:

```
                                        Parts by weight
Polymer blend _____ 100
N-phenyl-1-naphthylamine _____   1
Magnesium oxide _____   4
Petroleum wax _____   3
Clay _____  90
Light process oil _____  10
Zinc oxide _____   5
2-mercapto-2-imidazoline _____   1
```

The polymer blends are evaluated as described in paragraph C above. For comparison, polymer A-1 containing no other polymer is evaluated. Table II shows the data.

TABLE II

|  | (a) | (b) | (c) | (d) | (e) | (f) | (g) | (h) |
|---|---|---|---|---|---|---|---|---|
| Parts of polymer A-1 | 50 | 60 | 70 | 75 | 80 | 85 | 90 | 100 |
| Parts of polymer A-2 | 50 | 40 | 30 | 25 | 20 | 15 | 10 |  |
| Parts of polymer A-3 | 10 | 7.5 | 5 | 4 | 3 | 2 | 1 |  |
| Extrusion data: |  |  |  |  |  |  |  |  |
| Die swell | 1.66 | 1.71 | 1.79 | 1.90 | 1.99 | 1.98 | 1.98 | 2.06 |
| Smoothness | Excellent | Excellent | Excellent | Excellent | Excellent | Good | Good | Fair |
| Feather edge | Excellent | Excellent | Excellent | Excellent | Good | Fair | Poor | Poor |
| Stress strain data: |  |  |  |  |  |  |  |  |
| Modulus at 300% elongation, p.s.i. | 1,125 | 1,100 | 1,075 | 1,100 | 875 | 900 | 875 | 750 |
| Tensile strength at the break, p.s.i. | 1,575 | 2,050 | 2,325 | 2,225 | 2,125 | 2,400 | 2,425 | 2,375 |
| Elongation at the break, percent | 500 | 570 | 590 | 580 | 600 | 630 | 630 | 650 |

From the above table it can be seen that compositions falling outside the definition of this invention are unsatisfactory in some regard. The composition of column (a) shows very low tensile strength. This composition falls outside of the definition because it contains less than 55 parts of polymer A-1 and polymer A-2 is prepared from a monomer mixture containing less than 7 percent of chloroprene. The compositions of columns (e), (f) and (g) and polymer A-1 (column h) show high die swell and the latter three are deficient in smoothness and die definition.

EXAMPLE 3

This example shows the effect of varying amounts of the fluid polymer, A-3, in the blend. A polymer is prepared as described under polymer A-2 above using 10 parts of chloroprene and 90 parts of 2,3-dichloro-1,3-butadiene as the monomer composition. Blends are prepared containing 40 parts of this polymer and 60 parts of polymer A-1 using three different amounts of fluid polymer A-3. The isolated polymers are compounded using the same recipe as used in Example 2 and tested as described in paragraph C above. Table III shows the data.

TABLE III

|  | (a) | (b) | (c) |
|---|---|---|---|
| Parts of polymer A-3 | 5 | 7.5 | 10 |
| Extrusion data: |  |  |  |
| Die swell | 1.77 | 1.77 | 1.58 |
| Smoothness | Excellent | Excellent | Excellent |
| Feather edge | Excellent | Excellent | Excellent |
| Stress-strain data: |  |  |  |
| Modulus at 300% elongation, p.s.i. | 1,075 | 1,025 | 950 |
| Tensile strength at the break, p.s.i. | 2,400 | 2,250 | 2,150 |
| Elongation at the break, percent | 610 | 610 | 620 |

From this table it can be seen that die swell is slightly improved in the sample containing 10 parts of fluid polymer and that modulus and tensile strength decrease slightly as fluid polymer content increases.

EXAMPLE 4

To show the effect of using varying amounts of chloroprene in the preparation of polymer A-2, a series of polymers is prepared as described under polymer A-2 using, respectively, zero, 4, 7, 10, 20 and 30 percent of chloroprene in the total monomer mixture. Blends are prepared using varying amounts of these polymers with polymer A-1 and varying amounts of fluid polymer A-3. The isolated polymers are compounded using the recipe of Example 2 and are tested as described in paragraph C above. The results are shown in Tables IVa, IVb, and IVc.

From Tables IVa, IVb, and IVc it can be seen that in every case where the monomer composition used in polymer A-2 includes 20 or 30 percent chloroprene, the blend is deficient in extrusion properties. On the other hand, when polymer A-1 and polymer A-2 are used in a 50-50 ratio, the vulcanized blends are deficient in tensile strength in those cases where the monomer composition used in preparing polymer A-2 contains only 4 percent or less of chloroprene.

EXAMPLE 5

A blend is prepared containing 70 parts of polymer A-4 and 30 parts of polymer prepared as described under polymer A-2 using 7 parts of chloroprene and 93 parts of 2,3-dichloro-1,3-butadiene. The isolated polymer composition is compounded using the following recipe:

| | Parts by weight |
|---|---|
| Polymer blend | 100 |
| N-phenyl-1-naphthylamine | 1 |
| Petrolatum | 1 |
| Paraffin | 1 |
| Clay | 90 |
| Light process oil | 21 |
| Zinc oxide | 5 |
| 2-mercapto-2-imidazoline | 1 |

The compounded material is evaluated as described in paragraph C above. The material is cured by heating in a mold in a press for 30 minutes at 153° C. For comparison, polymer A-1 is tested at the same time in a recipe containing only 12 parts by weight of light process oil. Table V shows the data.

TABLE IVa

Blend composition, parts by weight: Polymer A-1, 50; polymer A-2, 50; polymer A-3, 10

|  | (a) | (b) | (c) | (d) | (e) | (f) |
|---|---|---|---|---|---|---|
| Percent of chloroprene used in polymer A-2 | 0 | 4 | 7 | 10 | 20 | 30 |
| Extrusion data: |  |  |  |  |  |  |
| Die swell | 1.62 | 1.66 | 1.69 | 1.72 | 2.01 | 2.17 |
| Smoothness | Excellent | Excellent | Excellent | Fair | Poor | V. poor |
| Feather edge | Excellent | Excellent | Excellent | Good | Poor | V. poor |
| Stress strain data: |  |  |  |  |  |  |
| Modulus at 300% elongation, p.s.i. | -------- | 1,125 | 1,125 | 1,190 | 1,130 | 1,050 |
| Tensile strength at the break, p.s.i. | 1,250 | 1,575 | 1,925 | 1,960 | 1,800 | 1,890 |
| Elongation at the break, percent | 210 | 500 | 560 | 600 | 600 | 650 |

TABLE IVb

Blend composition, parts by weight: Polymer A-1, 60; polymer A-2, 40; polymer A-3, 7.5

|  | (a) | (b) | (c) | (d) | (e) | (f) |
|---|---|---|---|---|---|---|
| Percent of chloroprene used in preparation of polymer A-2 | 0 | 4 | 7 | 10 | 20 | 30 |
| Extrusion data: |  |  |  |  |  |  |
| Die swell | 1.72 | 1.71 | 1.72 | 1.78 | 2.07 | 2.11 |
| Smoothness | Excellent | Excellent | Excellent | Excellent | Poor | V. poor |
| Feather edge | Excellent | Excellent | Excellent | Excellent | Poor | V. poor |
| Stress-strain data: |  |  |  |  |  |  |
| Modulus at 300% elongation, p.s.i. | 1,200 | 1,100 | 1,075 | 1,150 | 1,050 | 940 |
| Tensile strength at the break, p.s.i. | 1,925 | 2,050 | 2,350 | 2,230 | 2,280 | 1,820 |
| Elongation at the break, percent | 510 | 570 | 610 | 640 | 670 | 640 |

TABLE IVc

Blend composition, parts by weight: Polymer A-1, 70; polymer A-2, 30; polymer A-3, 5

|  | (a) | (b) | (c) | (d) | (e) | (f) |
|---|---|---|---|---|---|---|
| Percent of chloroprene used in polymer A-2 | 0 | 4 | 7 | 10 | 20 | 30 |
| Extrusion data: |  |  |  |  |  |  |
| Die swell | 1.81 | 1.79 | 1.83 | 1.79 | 2.11 | 2.05 |
| Smoothness | Excellent | Excellent | Excellent | Excellent | Poor | V. poor |
| Feather edge | Excellent | Excellent | Excellent | Excellent | Poor | V. poor |
| Stress-strain data: |  |  |  |  |  |  |
| Modulus at 300% elongation, p.s.i. | 1,075 | 1,075 | 1,025 | 1,030 | 1,000 | 910 |
| Tensile strength at the break, p.s.i. | 2,100 | 2,325 | 2,400 | 2,430 | 2,290 | 2,250 |
| Elongation at the break, percent | 560 | 590 | 620 | 640 | 680 | 680 |

TABLE V

| | Polymer blend | Polymer A-1 |
|---|---|---|
| Extrusion data: | | |
| Die swell | 1.90 | 2.19 |
| Smoothness | Excellent | Poor |
| Feather edge | Excellent | Fair |
| Stress-strain data: | | |
| Modulus at 300% elongation, p.s.i | 950 | 625 |
| Tensile strength at the break, p.s.i | 2,425 | 2,325 |
| Elongation at the break, percent | 710 | 650 |

As many widely different embodiments of this invention may be made without departing from the spirit and scope thereof, it is to be understood that this invention is not limited to the specific embodiments thereof except as defined in the appended claims.

What is claimed is:

1. An elastomeric composition comprising an intimate blend of (a) from about 50 to 75 percent by weight of a benzene-soluble solid polymer selected from the group consisting of a homopolymer of chloroprene and a copolymer prepared by polymerizing a mixture of monomers consisting of chloroprene and up to about 20 percent by weight of 2,3-dichloro-1,3-butadiene and (b) from about 50 to 25 percent by weight of a xylene-soluble solid polymer selected from the group consisting of a homopolymer of 2,3-dichloro-1,3-butadiene and a copolymer prepared by polymerizing a mixture of monomers consisting of 2,3-dichloro-1,3-butadiene and up to about 15 percent by weight of chloroprene, with the proviso that when the percentage of component (a) in the blend is less than 55 percent, component (b) must be a copolymer prepared by polymerizing a mixture of monomers consisting of 2,3-dichloro-1,3-butadiene and from about 7 to 15 percent by weight of chloroprene.

2. An elastomeric composition comprising an intimate blend of (a) from about 65 to 70 percent by weight of a benzene-soluble solid homopolymer of chloroprene and (b) from about 30 to 35 percent by weight of a xylene-soluble solid copolymer prepared by polymerizing a mixture of monomers consisting of 2,3-dichloro-1,3-butadiene and from about 3 to 7 percent by weight of chloroprene.

3. An elastomeric composition consisting essentially of (a) from about 50 to 75 percent by weight of a benzene-soluble solid polymer selected from the group consisting of a homopolymer of chloroprene and a copolymer prepared by polymerizing a mixture of monomers consisting of chloroprene and up to about 20 percent by weight of 2,3-dichloro-1,3-butadiene, (b) from about 50 to 25 percent by weight of a xylene-soluble solid polymer selected from the group consisting of a homopolymer of 2,3-dichloro-1,3-butadiene and a copolymer prepared by polymerizing a mixture of monomers consisting of 2,3-dichloro-1,3-butadiene and up to about 15 percent by weight of chloroprene, and (c) not more than about 15 percent by weight based on the total weight of components (a) and (b) of a benzene-soluble fluid chloroprene polymer prepared by polymerizing chloroprene in the presence of enough aliphatic mercaptan so that the resulting chloroprene polymer has an intrinsic viscosity in benzene at 30° C. of not greater than about 0.12, with the proviso that when the percentage of component (a) in the blend is less than 55 percent, component (b) must be a copolymer prepared by polymerizing a mixture of monomers consisting of 2,3-dichloro-1,3-butadiene and from about 7 to 15 percent by weight of chloroprene.

No references cited.